(12) United States Patent
Alowaiydh et al.

(10) Patent No.: US 12,486,462 B2
(45) Date of Patent: Dec. 2, 2025

(54) INTEGRATION OF EMISSIONS REDUCTION AND GAS SWEETENING IN GAS-OIL SEPARATION PLANT

(71) Applicant: SAUDI ARABIAN OIL COMPANY, Dhahran (SA)

(72) Inventors: Hamad M. Alowaiydh, Ras Tannurah (SA); Ayman M. Farsi, Ras Tannurah (SA); Ghassan M. Althagafi, Ras Tannurah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 238 days.

(21) Appl. No.: 18/489,714

(22) Filed: Oct. 18, 2023

(65) Prior Publication Data

US 2025/0129300 A1    Apr. 24, 2025

(51) Int. Cl.
*C25B 15/08* (2006.01)
*C10G 31/09* (2006.01)
(Continued)

(52) U.S. Cl.
CPC ............ *C10G 31/09* (2013.01); *C10G 33/08* (2013.01); *C25B 1/02* (2013.01); *C25B 15/081* (2021.01);
(Continued)

(58) Field of Classification Search
CPC .... C10G 31/09; C10G 33/00–08; C25B 1/02; C25B 15/081; C07C 1/12
See application file for complete search history.

(56) References Cited

U.S. PATENT DOCUMENTS 11,066,298 B2    7/2021  Rafati et al.
2018/0066194 A1*  3/2018  Soliman ................. C10G 31/06
(Continued)

FOREIGN PATENT DOCUMENTS

RU    2642861 C1 *  1/2018  ............... C25B 1/02
RU    2708957 C1    12/2019

OTHER PUBLICATIONS

English machine translation of RU 2642861 (Year: 2018).*

*Primary Examiner* — Renee Robinson
(74) *Attorney, Agent, or Firm* — Vorys, Sater, Seymour and Pease LLP

(57) ABSTRACT

A gas-oil separation plant (GOSP) system includes a crude inlet line extending to a separation vessel where a sour gas stream may be separated from an inlet fluid stream. The GOSP system provides an $H_2S$ membrane system where the sour gas stream may be directed for separation of $H_2S$ and an electrolyzer where $H_2$ may be separated from the $H_2S$. The GOSP system also includes a combustion gas turbine where an exhaust containing $CO_2$ is produced and a $CO_2$ membrane system where the $CO_2$ may be separated from the exhaust. The $H_2$ and CO2 may be combined and reacted in a Sabatier reactor to produce $CH_4$ and $H_2O$. The $CH_4$ may be used to fuel the combustion gas turbine and the $H_2O$ may be directed to a steam head for use in other processes. Additionally, a sweetened gas stream having the $H_2S$ removed may be exported by the GOSP system.

15 Claims, 3 Drawing Sheets

(51) Int. Cl.
   *C10G 33/08* (2006.01)
   *C25B 1/02* (2006.01)
   *C07C 1/12* (2006.01)
(52) U.S. Cl.
   CPC .......... *C07C 1/12* (2013.01); *C10G 2300/207* (2013.01)

(56) References Cited

U.S. PATENT DOCUMENTS

| | | | |
|---|---|---|---|
| 2022/0081622 A1* | 3/2022 | Gajbhiye | G09B 25/02 |
| 2022/0099003 A1 | 3/2022 | Lu et al. | |
| 2022/0380684 A1* | 12/2022 | Soliman | B01D 17/06 |
| 2024/0352592 A1* | 10/2024 | Alarawi | C25B 9/13 |

* cited by examiner

INTEGRATION OF EMISSIONS REDUCTION AND GAS SWEETENING IN GAS-OIL SEPARATION PLANT

FIELD OF THE DISCLOSURE

The present disclosure relates to efficiencies in operating a gas-oil separation plant (GOSP), and more specifically, to using exhaust byproducts such as hydrogen sulfide and carbon dioxide to enhance overall plant efficiency.

BACKGROUND OF THE DISCLOSURE

Crude oil produced from a subterranean wellbore often contains hydrocarbons mixed with impurities such as water and suspended solids. The crude oil may be separated into its constituent components at a GOSP facility near the wellbore such that the unwanted components do not need to be transported further. The hydrocarbons (oil and associated gases) may be separated from the water, and the resulting fluid streams may be directed to individual locations for further processing. For example, the water component may be directed to a water/oil separation (WOSEP) facility where crude oil may be separated from oily water, and the gas component may be directed to a gas compression facility for recovery.

Conventional GOSP facilities may suffer from deficiencies including low product yield, inefficient use of available heat sources (e.g., discharge streams of compressors), many separate units being used to meet a desired basic sediment and water (BS&W) specifications, high operating costs due to heating requirements, a large spatial footprint and high capital costs. By integrating and simultaneously implementing other processes (e.g., desalting, dehydration, sweetening and stabilization) into a GOSP facility, and by effectively identifying byproducts of the GOSP facility that may prove to be valuable resources, more efficient processes and systems may be defined or provided.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a gas-oil separation plant (GOSP) system includes a crude inlet line extending from a source of an inlet fluid stream, and a separation vessel fluidly coupled to the crude inlet line. The separation vessel is operable to separate a sour gas stream containing hydrogen sulfide ($H_2S$) from the inlet fluid stream. An $H_2S$ membrane system is fluidly coupled to the separation vessel to receive the gas sour stream therefrom, and is operable to separate the $H_2S$ from the sour gas stream. An electrolyzer is fluidly coupled to the membrane system to receive the $H_2S$ therefrom and is operable to separate hydrogen ($H_2$) from the $H_2S$. A combustion gas turbine is operable to generate power by burning a fuel and producing an exhaust containing carbon dioxide ($CO_2$), and a $CO_2$ membrane system operably coupled to the combustion gas turbine to receive the exhaust therefrom and to separate the $CO_2$ from the exhaust. A Sabatier reactor is fluidly coupled to the electrolyzer for receiving the $H_2$ therefrom and fluidly coupled to the $CO_2$ membrane system for receiving the $CO_2$ therefrom. The Sabatier reactor is operable to react the $H_2$ and the $CO_2$ with one another to produce methane ($CH_4$) and water ($H_2O$).

According to another embodiment consistent with the present disclosure, a method a for operating a GOSP system includes (a) flowing an inlet fluid stream into a separation vessel, (b) separating a sour gas stream from the inlet fluid stream, the sour gas stream including hydrogen sulfide ($H_2S$) contained therein, (c) flowing the sour gas stream to an $H_2S$ membrane system and separating the $H_2S$ from the sour gas stream with the $H_2S$ membrane system, (d) flowing the $H_2S$ from the $H_2S$ membrane system to an electrolyzer and separating hydrogen ($H_2$) from the $H_2S$ with the electrolyzer, (e) operating a combustion gas turbine to generate power by burning a fuel and to produce an exhaust containing carbon dioxide ($CO_2$), (f) flowing the exhaust from the combustion gas turbine to a $CO_2$ membrane system and separating the $CO_2$ from the exhaust with the a $CO_2$ membrane system, (g) flowing the $H_2$ from the $H_2S$ membrane system to a Sabatier reactor and flowing the $CO_2$ from the $CO_2$ membrane system to the Sabatier reactor, and (h) reacting the $H_2$ with the $CO_2$ with the Sabatier reactor to produce methane ($CH_4$) and water ($H_2O$).

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
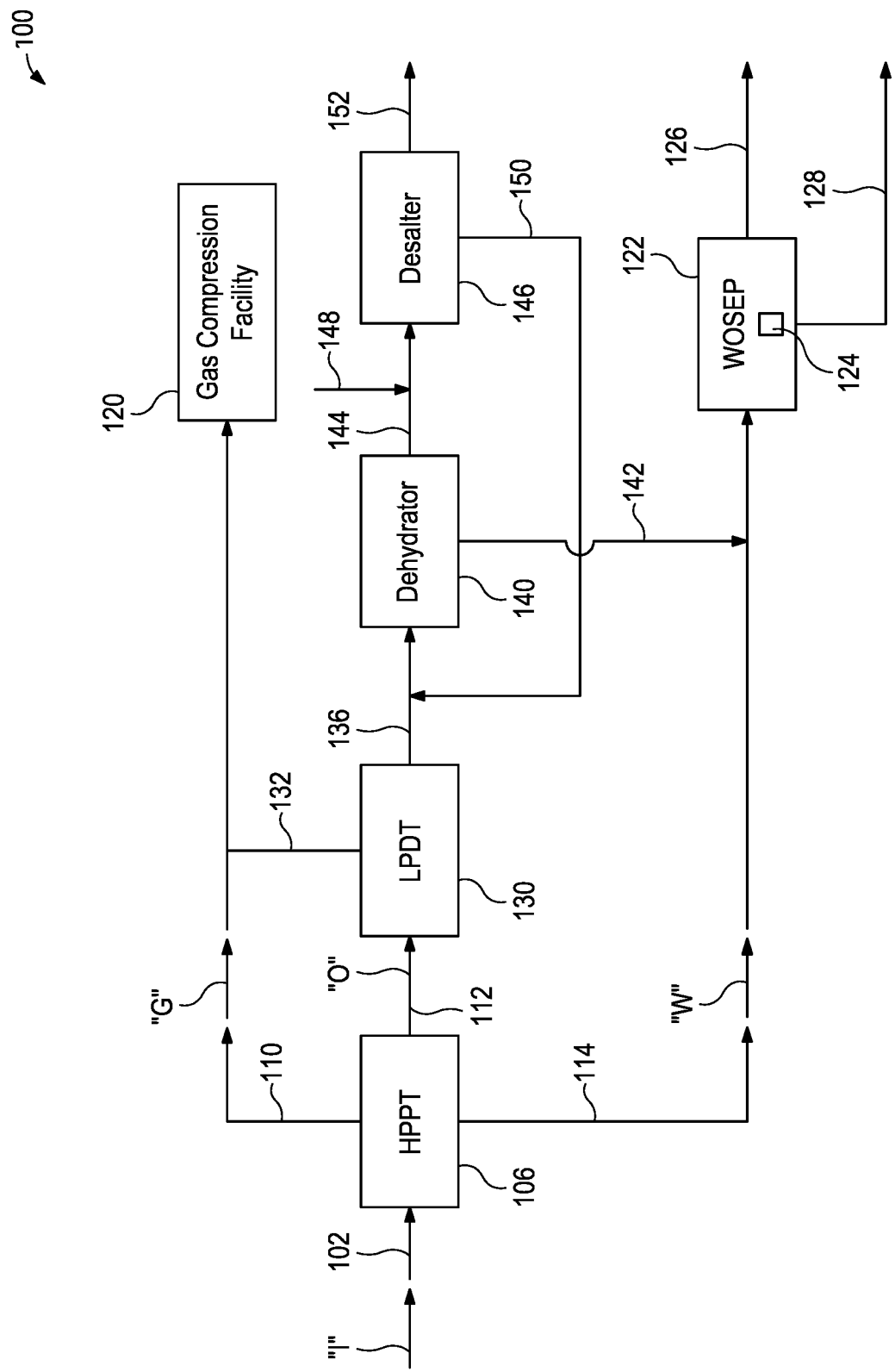
FIG. 1 is a partial schematic flow diagram of an example gas-oil separation plant (GOSP) that processes crude oil received from wellheads and discharges export crude oil as a product, and also includes a separation (WOSEP) facility where a water byproduct is directed and a gas compression facility where a gas byproduct is directed.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to a GOSP facility having a gas compression facility integrated therein. Carbon dioxide may be captured from the exhaust of a combustion gas turbine of the GOSP facility and hydrogen sulfide may be separated from a sewer gas stream in the GOSP facility. The hydrogen sulfide may be used as a source of hydrogen to be reacted with the carbon dioxide in a Sabatier reactor to produce methane water and heat. The produced methane may be exported for sale as fuel for ovens, water heaters, automobiles, etc., and/or may be redirected to the combustion gas turbine. The water and heat may be used to produce steam, which may be directed to a steam header for use in heating applications, driving compressors, cleaning processes, etc. In this manner, carbon dioxide emissions for the GOSP facility may be reduced, an overall efficiency of the GOSP facility may be increased and a profit may be generated from exported methane and steam.

FIG. 1 is a schematic flow diagram of an example GOSP system 100 including a crude inlet line 102. The crude inlet line 102 may be a transmission pipeline that carries an inlet fluid stream "I" from the wellhead(s) of one or more hydrocarbon-producing wellbores (not shown) to the GOSP system 100. The inlet fluid stream "I" may include a mixture of hydrocarbon gases, liquid oil, water (in both liquid and vapor forms), and salt and other solid sediments. It is important that at least a particular amount or proportion of the water, salt and sediments be removed from the inlet fluid stream "I" in order to prepare the fluid inlet steam "I" for further processing at a refinery and to avoid the corrosion of downstream piping, fittings, instrumentation and the like.

The inlet fluid stream "I" passes through the crude inlet line to a high-pressure production trap (HPPT) 106. The HPPT 106 may include a separator vessel such as a horizontal, three-phase separator, which generally uses gravity to separate the inlet fluid stream "I" into a gas component, an oil component and a water component. In some embodiments, the separation vessel 104 may alternatively or additionally employ various other methods of separating the incoming inlet fluid stream "I" into components including impingement, changing a flow direction and/or velocity of the fluid stream and/or application of a centrifugal force. The gas component exits the HPPT 106 through a gas line 110 as gas stream "G," the oil component exits the HPPT 106 through an oil line 112 as an oil stream "O" and the water component exits the HPPT 106 through a water line 114 as a water stream "W."

The gas stream "G" may be directed to a gas compression facility 120 for recovery in accordance with various aspects of the present disclosure as described in greater detail below. The water stream "W" may be directed to a water-oil separator (WOSEP) 122, which may have an internal separator 124 (e.g., a weir arrangement) that separates any remaining crude oil in the water stream "W." The WOSEP 122 may have a first water discharge 126 through which water with a first oil content may be discharged. For example, water having less than 1 vol % of crude oil, less than 0.1 vol % of crude oil, or less than 0.01 vol % of crude oil may be discharged through the first water discharge 126 for disposal, injection or other uses. The WOSEP may have a second water discharge 128 through which water with a second oil content, e.g., water having crude oil in a range of about 1 vol % to about 10 vol %, may be discharged. Water discharged through the second water discharge 128 may be directed through further processing units (not shown) for recovery of the retained oil.

The oil stream "O" exiting the HPPT 106 may be directed to a low pressure degassing tank (LPDT) 130. The LPDT 130 may include a cyclonic separator or other mechanisms for further separating entrained gas from the oil stream "O." The gas separated in the LPDT 130 may pass through a gas line 132 to join the gas stream "G" in the gas line 110. The remaining oil stream "O" may exit the LPDT 130 through oil line 136, which carries the oil stream to a dehydrator 140.

In some embodiments, the dehydrator 140 may employ electrostatic coalescence to partially dry the oil stream "O." An electrostatic field may be generated between electrodes in the dehydrator 140, causing water droplets in oil stream "O" to collide, coalesce into larger (heavier) drops, and settle out of the oil stream "O." The settled water may be discharged through a water discharge line 142 where it may join the water stream "W" in the water line 114. In some example embodiments, water discharged through the water discharge line 142 may have less than 20 vol % oil. The dehydrator 140 may discharge the remaining oil stream "O" through an oil discharge line 144 extending to a desalter 146.

In the illustrated embodiment, the desalter 146 may include a single stage vessel, but those skilled in the art will recognize that in other embodiments, the desalter 146 may include multiple stages. The desalter 146 may include skimmers, electrodes or other mechanisms for removing salts and other sediments from the oil stream "O." In some embodiments, wash water may be supplied to the desalter 146 through a wash water injection line 148 to promote separation of the salts from the oil stream "O." The wash water injected may have a relatively low salinity, e.g., from about 100 parts per million (ppm) to about 12,000 ppm to effectively carry salts from the desalter 146. The wash water carrying salt separated in the dehydrator 146 may be discharged through a water discharge line 150 and recycled to the dehydrator 140. The oil stream "O" may be discharged from the desalter 146 through an export line 152, and may be delivered to a refinery or other destination meeting salt and sediment content specifications.

Figure 2:
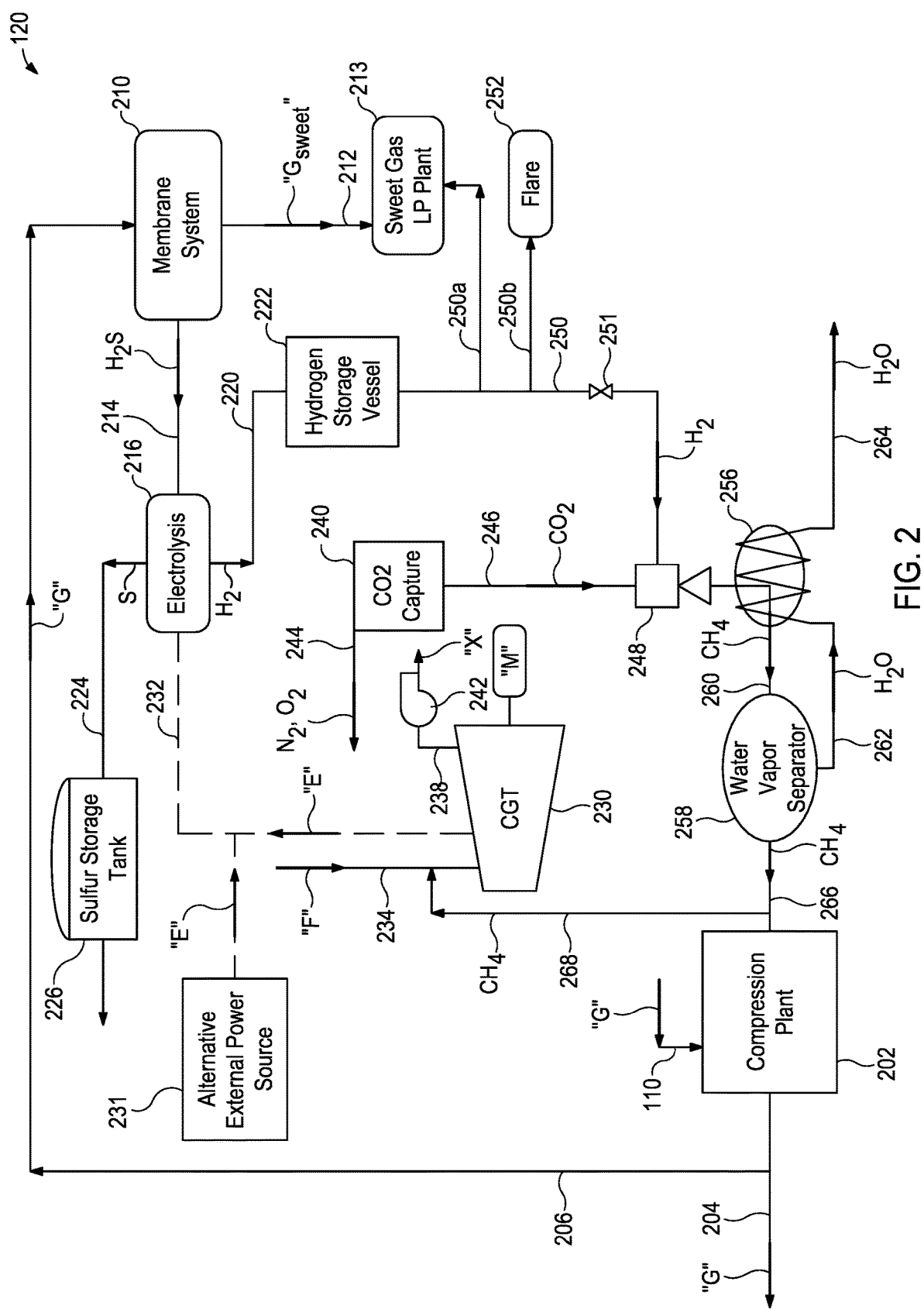
FIG. 2 is a partial, schematic flow diagram illustrating the gas compression facility of FIG. 1 in accordance with one or more aspects of the present disclosure.

Referring now to FIG. 2, the gas compression facility 120 is illustrated in accordance with one or more aspects of the present disclosure. The gas line 110 feeds the gas stream "G" to a compression plant 202. The compression plant 202 may include turbines, coolers and other equipment for compressing the gas stream "G". In some embodiments, the compression plant 202 may compress the gas stream "G" to a pressure of about 350 psig. The pressurized gas stream "G" may be discharged from the compression plant 203 through a high pressure line 204 for export, for sale or for use in other manufacturing processes.

A portion of the pressurized gas stream "G" may be diverted through an input line 206 extending to an $H_2S$ membrane system 210. The gas stream "G" within the input line 206 may be "sour," which generally indicates that the gas contains significant amounts of hydrogen sulfide ($H_2S$). Natural gas may usually be considered "sour" if there are more than 5.7 milligrams of $H_2S$ per cubic meter of natural gas (about 4 ppm by volume under standard temperature and pressure). The amount of $H_2S$ in the gas stream "G" delivered to the $H_2S$ membrane system 210 may be greater or less than 5.7 milligrams of $H_2S$ per cubic meter without departing from the scope of the disclosure.

Sour gas is generally corrosive to transmission lines and to engines or turbines if used as fuel. The $H_2S$ membrane system 210 separates the $H_2S$ from the gas stream "G" to sweeten the gas stream using any number of techniques known in the art. For example, the membrane system may first employ filters to remove any particulate matter and moisture from the gas stream "G". The gas stream "G" may then be heated and delivered to a membrane constructed of ceramics, polymers or other or other materials. The $H_2S$ (as well as any carbon dioxide ($CO_2$) and water vapor ($H_2O$)) permeate through the membrane leaving the heavier hydrocarbons such as methane ($CH_4$) behind. The sweetened gas stream "$G_{sweet}$" may be discharged through a sweet gas line 212 for export to a low pressure compression plant 213 or other facility. The $H_2S$ may be discharged from the $H_2S$ membrane system 210 through a transmission line 214 extending to an electrolyzer 216.

The electrolyzer 216 generally uses electricity to separate the hydrogen from the sulfur in the $H_2S$ provided from the $H_2S$ membrane system 210, a process generally referred to as "electrolysis". The electrolyzer 216 may include an anode and a cathode (not shown) separated by an electrolyte (not shown) suitable for appropriately reacting with the $H_2S$. The hydrogen ($H_2$) separated in the electrolyzer 216 is directed through a hydrogen transmission line 220 to a hydrogen storage vessel tank 222 where the $H_2$ may be accumulated and stored. The sulfur(S) separated in the electrolyzer 216 is directed through a sulfur transmission line 224 to a sulfur storage tank 226. The sulfur S may be stored in the sulfur storage tank 226 until it may be collected by a tanker for disposal or transport to an appropriate destination.

The electricity "E" for operating the electrolyzer 216 may be produced by a combustion gas turbine (CGT) 230 and/or an external power source 231, such as solar panels operatively coupled to (and in electrical communication with) the electrolyzer 216. The CGT 230 may also be employed in the GOSP system 100 (FIG. 1) for other purposes, e.g., in addition to supplying electricity "E," such as driving a prime mover "M." For example, in some embodiments, the prime mover "M" may be a compressor installed in the gas line 110 for propelling the gas stream "G" to the gas compression facility 120. In other embodiments, the prime mover "M" may be a pump installed in the water line 114 for driving the water stream "W" toward the WOSEP 122.

The electricity "E" may be provided to the electrolyzer 216 through a power transmission line 232. The CGT 230 may burn fuel gas "F" provided through a fuel line 234 extending from a fuel gas system (not shown) or another source for fuel gas "F." The exhaust "X" from the CGT 230 may be directed through an exhaust line 238 to a carbon dioxide ($CO_2$) membrane system 240. The exhaust "X" of a simple cycle combustion of fuel gas "F" typically contains concentrations of $CO_2$ of around 8% at temperatures of about 1000° F. In some applications, a pressure of the exhaust "X" may be increased by a blower 242 before the exhaust "X" enters the $CO_2$ membrane system 240.

The $CO_2$ membrane system 240 separates $CO_2$ in the exhaust "X" from the other components (mostly Nitrogen ($N_2$) and Oxygen ($O_2$)). The pressure increase provided by the blower 242 may enhance the operation of the $CO_2$ membrane system 240 permitting for a greater proportion of the $CO_2$ to be separated from the other components. The $N_2$ and $O_2$ may be vented to the atmosphere through an exhaust stack 244 of the membrane system 240 and the $CO_2$ may be directed through a $CO_2$ line 246 to an ejector 248.

In the ejector 248, the $CO_2$ is entrained with the hydrogen $H_2$ supplied from the hydrogen storage vessel 222 through a hydrogen delivery line 250. In some embodiments, the rate and other flow characteristics of the hydrogen $H_2$ delivered from the hydrogen storage vessel 222 may be regulated by a flow control valve (FCV) 251 coupled (arranged) within the hydrogen delivery line 250 to accommodate the amount of $CO_2$ being delivered from the $CO_2$ membrane system 240.

The hydrogen delivery line 250 may include a first branch 250a extending to the low pressure compression plant 213 or other facility (not shown) where the sweetened gas stream "$G_{sweet}$" is carried through gas line 212. In the event there is a low demand for hydrogen $H_2$, the first branch 250a may be used to direct a portion of the hydrogen $H_2$ to the low pressure compression plant 213 where the hydrogen $H_2$ may be mixed with the sweetened gas stream "$G_{sweet}$" to avoid unnecessary losses of energy. The hydrogen delivery line 250 may also include a second branch 250b through which a portion of the hydrogen $H_2$ may be delivered to a flare system 252. In the event there is a system upset, such as a shutdown of the GOSP system 100 where it would be unsafe to store hydrogen $H_2$ in the hydrogen storage vessel 222, the second branch 250b may be employed to deliver hydrogen $H_2$ to the flare system 252. The first and second branches 250a, 250b thereby facilitate safe management of the hydrogen $H_2$. The hydrogen $H_2$ that is not directed through the first or second branch 250a, 250b is delivered through the FCV 251 to the ejector 240 and in the proper predetermined ratio to be entrained with the $CO_2$.

The ejector 248 delivers the hydrogen $H_2$ and carbon dioxide $CO_2$ to a Sabatier reactor 256. Within the Sabatier reactor 256, the $CO_2$ may react with the $H_2$ in the presence of a nickel based catalyst at 400° C. to produce methane ($CH_4$), water ($H_2O$) and heat according to the chemical formula (1) below.

$$CO_2 + 4H_2 \xrightarrow{400°\ C. + \text{Catalyst (Ni)}} CH_4 + 2H_2O + \text{Heat} \qquad (1)$$

Wet $CH_4$ gas that is produced in the reaction will be directed from the Sabatier reactor 256 to a water separator 258 through a methane transmission line 260. At the water separator 258, $H_2O$ separated from the $CH_4$ gas will be directed through a water return line 262 where the $H_2O$ may be combined with steam and free $H_2O$ produced in the Sabatier reactor 256. The combined $H_2O$ may be directed through a water delivery line 264 to a medium pressure steam header (not shown) or another destination where the steam may be sold or directed for use in another industrial process.

The dried $CH_4$ from the water separator 258 may be directed to the compression plant 202 through a methane transmission line 266. The dried $CH_4$ may be compressed in the compression plant 202 and combined into the gas stream "G" passing through high pressure line 204. A portion of the dried $CH_4$ leaving the water separator 258 may be diverted through a diversion line 268 that is fluidly coupled between the methane transmission line 266 and the fuel line 234. In this way, a portion of the dried $CH_4$ may be employed to operate the CGT 230.

The gas compression facility 120 may improve the overall efficiency of the GOSP 100 (FIG. 1) in various ways. For example, the gas compression facility 120 may improve the integrity of transmission lines such as sweet gas line 212 by removing $H_2S$ from the gas transported therethrough. The gas compression facility 120 also reduces the carbon footprint of the compression facility by capturing the $CO_2$ from the exhaust of the CGT 230 and by producing $CH_4$ from the captured the $CO_2$, which may be used as fuel for operating the CGT 230. The $CH_4$ and the $H_2O$ exported through the high pressure line 204 and the water delivery line 264 may generate profits for the GOSP 100 in addition to the profits generated by the gas stream "$G_{sweet}$" exported through the sweet gas line 212.

Figure 3:
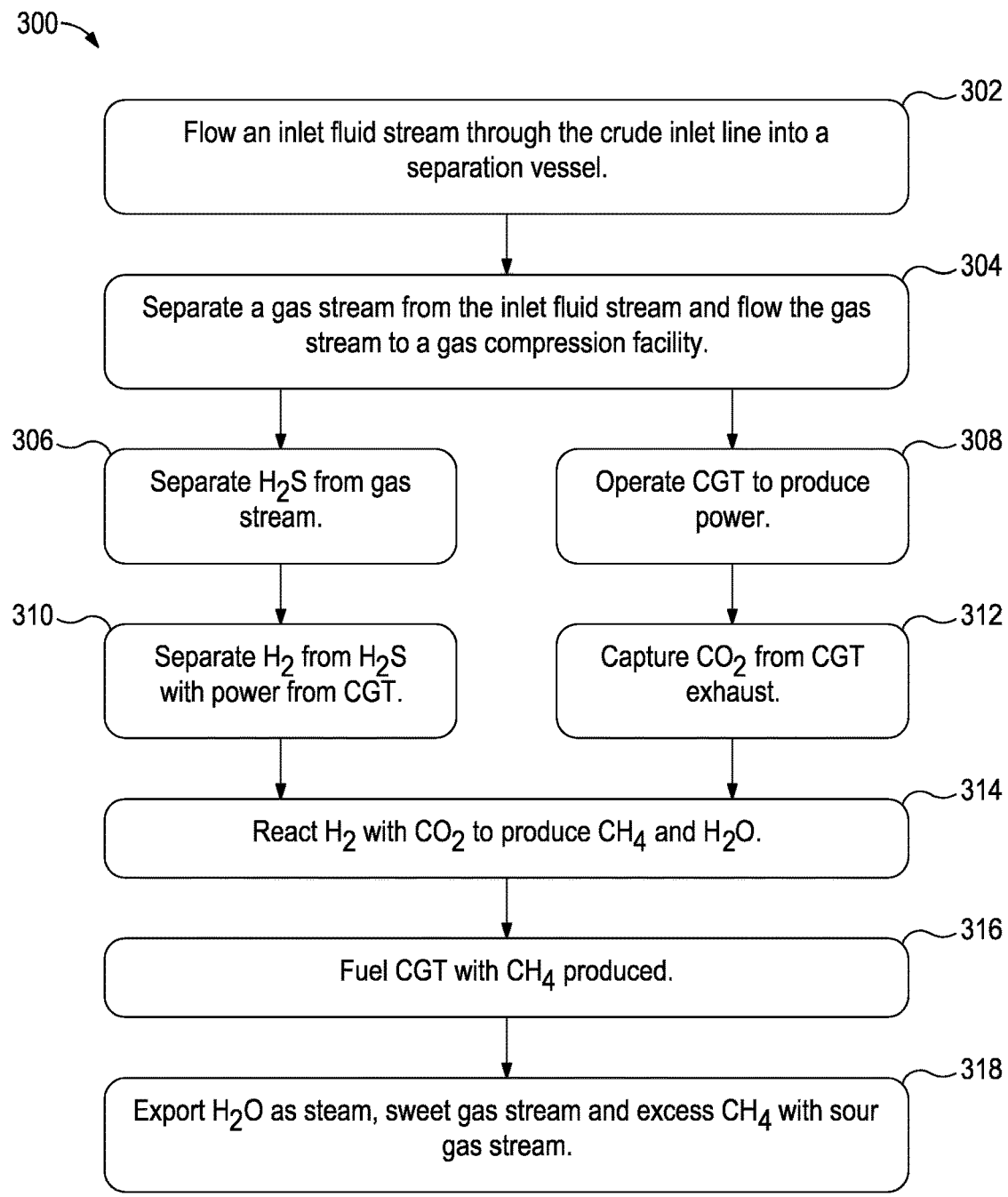
FIG. 3 is flowchart illustrating a procedure for operating the gas compression facility of FIG. 2 to enhance the overall operation of the GOSP plant of FIG. 1 in accordance with one or more aspects of the present disclosure.

Referring now to FIG. 3, and with continued reference to FIGS. 1 and 2, a procedure 300 is described for operating the GOSP system 100, including the gas compression facility 120. Initially at step 302, inlet fluid stream "I" is flowed through the crude inlet line 102 into a separation vessel, such as HPPT 106 and LPDT 130. A gas stream "G" is separated from the inlet fluid stream in the separation vessels 106, 130 and flowed to a gas compression facility 120 (step 304).

At the compression gas facility 120, $H_2S$ is separated from the gas stream with $H_2S$ membrane system 210 (step 306) and CGT 230 is operated to produce power (308). At step 310, $H_2$ is separated from the $H_2S$ using electrolyzer 216, which is powered with the power generated by the CGT 230, and/or power from the external power source 231, such as solar panels. In some embodiments, the $H_2$ may be stored in hydrogen storage vessel 222 such that the distribution of $H_2$ may be regulated, e.g., with the FCV 251, based on the quantity of $CO_2$ in the $CO_2$ line 246 to ensure a proper ratio of $H_2$ and $CO_2$ in the Sabatier reactor 256. At step 312, $CO_2$ is captured from the exhaust of the CGT 230, e.g., with $CO_2$ membrane system 240.

Next at step 314, the $H_2$ is entrained and reacted with the $CO_2$ in a Sabatier reactor 256. The reaction produces $CH_4$, $H_2O$ and heat. A portion of the $CH_4$ produced may be dried in water vapor separator 258 and flowed to the CGT 230 to fuel the CGT 230 (step 316). At step 318, the gas compression facility 120 exports the $H_2O$ as steam through water delivery line 264, a sour gas stream including excess $CH_4$ through high pressure line 204 and a sweet gas stream "$G_{sweet}$" through sweet gas line 212.

It should be appreciated that the steps of procedure 300 may be conducted in alternate orders, and many or all of the steps may be conducted concurrently. Also not every step may be performed in every procedure for operating the GOSP system 100 and gas compression facility 120.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A gas-oil separation plant (GOSP) system, comprising:
   a crude inlet line extending from a source of an inlet fluid stream;
   a separation vessel fluidly coupled to the crude inlet line and operable to separate a sour gas stream containing hydrogen sulfide ($H_2S$) from the inlet fluid stream;
   an $H_2S$ membrane system fluidly coupled to the separation vessel to receive the sour gas stream therefrom, the membrane system operable to separate the $H_2S$ from the sour gas stream;
   an electrolyzer fluidly coupled to the membrane system to receive the $H_2S$ therefrom; the electrolyzer operable to separate hydrogen ($H_2$) from the $H_2S$;
   a combustion gas turbine operable to generate power by burning a fuel and producing an exhaust containing carbon dioxide ($CO_2$);
   a $CO_2$ membrane system operably coupled to the combustion gas turbine to receive the exhaust therefrom and to separate the $CO_2$ from the exhaust; and
   a Sabatier reactor fluidly coupled to the electrolyzer for receiving the $H_2$ therefrom and fluidly coupled to the $CO_2$ membrane system for receiving the $CO_2$ therefrom, the Sabatier reactor operable to react the $H_2$ and the $CO_2$ with one another to produce methane ($CH_4$) and water ($H_2O$).

2. The GOSP system of claim 1, further comprising a hydrogen storage vessel fluidly coupled between the electrolyzer and the Sabatier reactor.

3. The GOSP system of claim 2, further comprising an ejector fluidly coupled between the hydrogen storage vessel and the Sabatier reactor and fluidly coupled between the $CO_2$ membrane system and the Sabatier reactor, the ejector operable to regulate the flow of $H_2$ from the hydrogen storage vessel and to entrain the $H_2$ with the $CO_2$.

4. The GOSP system of claim 1, wherein the electrolyzer is operably coupled to at least one of the combustion gas turbine or an external power source to receive the power therefrom.

5. The GOSP system of claim 4, further comprising a methane transmission line fluidly coupled between the Sabatier reactor and the combustion gas turbine, the methane transmission line operable to deliver the $CH_4$ from the Sabatier reactor to the combustion gas turbine for use by the combustion gas turbine as the fuel.

6. The GOSP system of claim 1, further comprising a water vapor separator fluidly coupled to the Sabatier reactor to receive the $CH_4$ therefrom, the water vapor separator operable to dry the $CH_4$.

7. The GOSP system of claim 6 further comprising a water return line fluidly coupled between the water vapor separator and the Sabatier reactor, the water return line operable to return $H_2O$ separated from the $CH_4$ to the Sabatier reactor where the $H_2O$ may be combined with steam and free $H_2O$ produced in the Sabatier reactor and directed to a steam header.

8. The GOSP system of claim 1, further comprising a blower fluidly coupled between the combustion gas turbine and the $CO_2$ membrane system, the blower operable to increase a pressure of the exhaust of the combustion gas turbine delivered to the $CO_2$ membrane system.

9. A method for operating a GOSP system, the method comprising:
   flowing an inlet fluid stream into a separation vessel;
   separating a sour gas stream from the inlet fluid stream, the sour gas stream including hydrogen sulfide ($H_2S$) contained therein;
   flowing the sour gas stream to an $H_2S$ membrane system and separating the $H_2S$ from the sour gas stream with the $H_2S$ membrane system;
   flowing the $H_2S$ from the $H_2S$ membrane system to an electrolyzer and separating hydrogen ($H_2$) from the $H_2S$ with the electrolyzer;
   operating a combustion gas turbine to generate power by burning a fuel and to produce an exhaust containing carbon dioxide ($CO_2$);
   flowing the exhaust from the combustion gas turbine to a $CO_2$ membrane system and separating the $CO_2$ from the exhaust with the a $CO_2$ membrane system;
   flowing the $H_2$ from the $H_2S$ membrane system to a Sabatier reactor and flowing the $CO_2$ from the $CO_2$ membrane system to the Sabatier reactor; and
   reacting the $H_2$ with the $CO_2$ with the Sabatier reactor to produce methane ($CH_4$) and water ($H_2O$).

10. The method of claim 9, further comprising storing and accumulating the $H_2$ in a hydrogen storage vessel fluidly coupled between the electrolyzer and the Sabatier reactor.

11. The method of claim 10, further comprising regulating a flow of the $H_2$ from the hydrogen storage vessel and entraining the $H_2$ with the $CO_2$ with an ejector fluidly coupled between the $CO_2$ membrane system, the hydrogen storage vessel and the Sabatier reactor.

12. The method of claim 9, further comprising powering the electrolyzer with at least one of power generated by the combustion gas turbine or power from an external power source.

13. The method of claim 12, further comprising flowing the $CH_4$ through a methane transmission line between the Sabatier reactor and the combustion gas turbine and using the $CH_4$ as the fuel for combustion gas turbine.

14. The method of claim 9, further comprising drying the $CH_4$ produced in the Sabatier reactor with a water vapor separator and returning water separated from the $CH_4$ to the Sabatier reactor through a water return line fluidly coupled between the water vapor separator and the Sabatier reactor.

15. The method of claim 9, further comprising increasing a pressure of the exhaust of the combustion gas turbine delivered to the $CO_2$ membrane system with a blower fluidly coupled between the combustion gas turbine and the $CO_2$ membrane system.

* * * * *